United States Patent [19]
Vilbeuf

[11] 4,272,117
[45] Jun. 9, 1981

[54] SEAT WITH DAMPED SUSPENSION SYSTEM

[75] Inventor: Jean Vilbeuf, Paris, France

[73] Assignee: Sifra, Gien, France

[21] Appl. No.: 922,277

[22] Filed: Jul. 6, 1978

Related U.S. Application Data

[63] Continuation-in-part of Ser. No. 790,137, Apr. 22, 1977, Pat. No. 4,148,518.

[30] Foreign Application Priority Data

Dec. 8, 1976 [FR] France ................................ 76 36957

[51] Int. Cl.³ .............................................. B60N 1/02
[52] U.S. Cl. .................................. 296/65 R; 248/588
[58] Field of Search .............. 296/65 R; 248/588, 631

[56] References Cited

U.S. PATENT DOCUMENTS

3,954,245   5/1976   Costin ................................ 248/631

Primary Examiner—John J. Love
Assistant Examiner—John A. Carroll
Attorney, Agent, or Firm—Michael J. Striker

[57] ABSTRACT

This sprung seat notably for off-road vehicles is mounted on the vehicle's frame and provided with elastic return means in the form of a hydropneumatic device associated with an automatic monitoring distributor adapted to be connected to the pressure fluid circuit of the vehicle and capable of regulating the fluid pressure in the hydropneumatic device as a function of the seat squab frame oscillation. The hydropneumatic device is constructed to eliminate suction and incorporates an adjustable valve means adapted to be set as a function of the weight of the occupant of the seat.

26 Claims, 19 Drawing Figures

SEAT WITH DAMPED SUSPENSION SYSTEM

CROSS-REFERENCE TO RELATED APPLICATIONS

The present application is a continuation-in-part of Ser. No. 790,137 filed Apr. 22, 1977, now issued as U.S. Pat. No. 4,148,518.

BACKGROUND OF THE INVENTION

1. Field of the Invention

The present invention relates to seats for wheel-tractors, construction machinery and the like, powered military vehicles of all kinds, and more generally to any vehicle intended for travelling on uneven grounds or off the road and wherein the absence of a suspension system or the inefficiency of the existing suspension system does not provide a sufficient degree of comfort for the driver and/or the user.

2. Description of the Prior Art

Various types of seats intended for vehicles of the abovementioned types and equipped with suspension systems providing an elastic return action and the damping of the seat oscillation in case of shocks and jolts in a vertical plane, are already known in the art. In a known construction, the seat is connected to a frame structure through linkage means constituting a parallel motion mechanism in which the lower links are rigidly coupled to a rubber ring capable of providing said elastic return action and damping the oscillation. This rubber ring in shear- and torsion stressed, and adapted to damp out both shocks and oscillation due to the inherent rubber hysteresis.

Another known construction comprises two pairs of pivoted arms disposed laterally between the squab-supporting cradle and the seat base, the ends of said arms being adapted to move along horizontal runways or guide-paths provided on said cradle and said base. The four arms or links are identical and form two "X", the upper arms being longer than the lower arms. The suspension member of this seat consists of a transverse torsion bar having one end adjustably anchored and the other end adapted to co-act with a link.

Experience teaches that these arrangements are not capable of fully damping out all shocks and oscillation, notably when the second construction is used, which is relatively complicated and expensive to manufacture. Moreover, in this second device, the reaction force of the torsion bar constituting the elastic member is transmitted to only one side of the mechanism, thus causing twistings in, and consequently abnormal kinkings of, the various metal components of the suspension system. As a result, more pronounced wear and tear of the pivot means are observed on one side of the seat as compared with the opposite side.

U.S. Pat. No. 3,752,432 discloses a seat provided with a hydropneumatic damping device. However, this device has no monitor which would permit automatic adjustment of the seat height in actual service as a function of the driver's or occupant's weight.

U.S. Pat. No. 3,879,007 describes a vehicle seat provided with a damper consisting of a cylinder and piston unit. Thus, this seat has the disadvantages mentioned above, such as, excessive height, tendency to abnormal wear, change of damping characteristics with time, and so forth.

With the hydraulic control circuit described in this U.S. Pat. No. 3,879,007 the driver, before utilizing the seat, must manually adjust its height as a function of his own weight. More particularly, he sets a three-way valve manually to a position "R" to raise the seat, and actuating the same valve to another position "L" will lower it.

Having thus adjusted the seat level, the driver shuts the valve and the seat oscillations are damped only by an accumulator and control valves.

It is clear that this system is also ill suited for adapting the seat to automatic monitoring adjustment.

U.S. Pat. No. 3,300,203 describes a seat provided with a cylinder supporting the seat frame structure and connected to a hydropneumatic damping device. This device shares the disadvantages of The device taught in U.S. Pat. No. 3,879,007. Again, no automatic monitoring device is incorporated in this seat suspension system.

In the vehicle seat disclosed in French Patent Application Ser. No. 76.21065 these inconveniences are partially avoided by providing a suspension system comprising a central inclined main beam pivotally connected between the base frame and the rear portion of an upper frame which supports the seat squab, the main beam co-acting with a pair of parallel lateral arms pivotally connected between the rear portion of the base frame and the front portion of the seat squab frame. Each lateral arm is rigidly connected intermediate its ends to a transverse shaft which itself is trunnioned in said main beam.

Here, the rigid main beam transmits the reaction torque to an elastic member and this elastic member tends to counteract the vertical movements of the seat squab frame. The assembly of the pivoted beam and pivoted arms pivoted according to the above-described arrangement constitutes a rigid system in which the seat squab frame can move uniformly vertically with suspension vibration.

Additionally, a set of rollers associated with the main beam and the lateral arms is adapted to keep the seat in a plane slightly inclined to the horizontal when the seat squab frame is shaken vertically.

This arrangement is particularly advantageous but cannot completely eliminate parasitic mechanical friction between the elements of the system.

DESCRIPTION OF THE INVENTION

It is the primary object of the present invention to avoid the disadvantages of the prior art by providing a sprung seat similar to the one disclosed in the aforesaid French Patent Application with its attendant advantages but improving it by adding a suspension which is free of any parasitic mechanical friction contact.

In this invention, a sprung suspension is mounted on a base frame and supports an upper movable frame which is provided with an elastic return means. The elastic return means include a hydropneumatic device associated with an automatic monitoring distributor adapted to be connected to the pressurized hydraulic or pneumatic system of the vehicle and capable of regulating the fluid pressure in the hydropneumatic device as a function of the seat squab cradle oscillation, independently of the driver's or occupant's weight.

It is therefore clear that when the seat is jolted so as to cause the seat cradle to oscillate, no detrimental mechanical friction takes place in the hydropneumatic device associated with its monitoring distributor.

In a preferred embodiment, the hydropneumatic device includes a pneumatic chamber associated with a hydraulic cylinder or actuator is which the piston is connected to a main beam of the suspension system, this hydropneumatic device being associated with an automatic monitoring distributor incorporated in the device and adapted to be connected to the pressurized hydraulic or pneumatic system of the vehicle and to automatically regulate the pressure in a hydropneumatic device in conjunction with the oscillation of the movable upper frame independently of the driver's or occupant's weight, and wherein the base frame is disposed horizontally, with the hydraulic cylinder being mounted above the pneumatic chamber and under the main beam, the hydraulic chamber of said actuator being bounded, on the side of said main beam and laterally, by a reinforced membrane against which said piston is adapted to react.

The monitoring distributor communicates either with the hydraulic chamber of the actuator or with the pneumatic chamber. The latter is substantially level with the base frame and connected via the hydraulic actuator to the main beam of the pivoted seat structure. If the vehicle has a hydraulic system, the monitoring distributor is connected between this system (via a suitable pressure-reducing device), and the pressure liquid chamber of the hydraulic actuator in which it regulates the pressure as a function of the stresses transmitted by the piston and the main beam as a consequence of the seat oscillation.

In the case of a vehicle equipped with a pneumatic or compressed-air system, the distributor is connected between this circuit and the pneumatic chamber in which it regulates the pressure as a function of the seat oscillation, the hydraulic fluid being enclosed permanently in the actuator chamber.

According to an essential feature characterizing this invention, the automatic monitoring distributor controlling the fluid pressure in the hydraulic actuator utilizes a movable spool or slide valve responsive to hydraulic pressure, together with means for automatically controlling the movement of the spool valve between a first position in which the fluid flows from the hydraulic actuator to the outlet of the distributor while the movable seat squab frame moves downwardly and the main beam actuates the piston of the actuator, and a second position in which the pressurized fluid enters the chamber of the hydraulic actuator while the distributor outlet is shut off, thus raising the piston and the movable seat squab frame.

Therefore, this first position corresponds to the discharge of hydraulic fluid from the chamber of the hydraulic actuator, at the beginning of an oscillation of the movable seat squab frame as the latter moves towards the base frame. The second position of the distributor spool valve is obtained when the movable frame approaches the base frame sufficiently to cause a movement of the spool valve, causing fluid to be injected under pressure into the actuator chamber, the distributor outlet being shut off or closed in this case.

According to another feature characterizing this invention, the actuator is provided with a hydraulic damper consisting preferably of a partition immersed in the liquid under pressure and having its outer periphery secured to the base of said actuator, said partition having through-going orifices formed and being associated with damping valves adapted to adjust the flow of liquid from one compartment to another compartment of said chamber.

The partition and its damping valves advantageously complete the hydropneumatic device and considerably improve the efficiency of the seat suspension.

According to a preferred embodiment of the invention, the piston controlling the reinforced membrane consists of a central bulged portion of the main beam with its convex surface directed towards the hydraulic chamber, the bulged portion engaging the reinforced membrane; the piston being operatively connected to a hydraulic damper housed within the chamber and including a partition immersed in the liquid under pressure and having its outer periphery secured to the base of said actuator cylinder, the damper further including a rod rigidly connected to the piston of the main beam, said rod carrying a second piston housed within a body fastened to the aforesaid partition, hydraulic fluid passage means being formed through said body and said second piston.

With this arrangement the hydraulic fluid can flow from one compartment to the other compartment of the actuator chamber through the damper, while eliminating any partial vacuum effect during the oscillations. Thus, the hunting effects sometimes observed when the seat is moving upwardly, and which interfere with the seat movement, are substantially eliminated so that the upward movements of the seat take place unimpeded.

According to another form of embodiment of the invention, the hydraulic fluid passage means are provided between the end of the damper body fastened to said partition and the damper rod, on the one hand, and in the damper body, on the other hand, the cross sectional area of the aperture between the rod and the body end being smaller than that of said aperture or of the apertures formed laterally in said body.

Thus, when the piston of the main beam descends towards the damper, the hydraulic fluid scavenged both from the upper compartment of the hydraulic chamber and through the end piston of said damper is transferred into the lower compartment of said chamber via the large-area apertures formed in the body of said damper.

Other features and advantages of this invention will appear as the following description proceeds with reference to the attached drawings.

DESCRIPTION OF THE PREFERRED EMBODIMENTS

Figure 1:
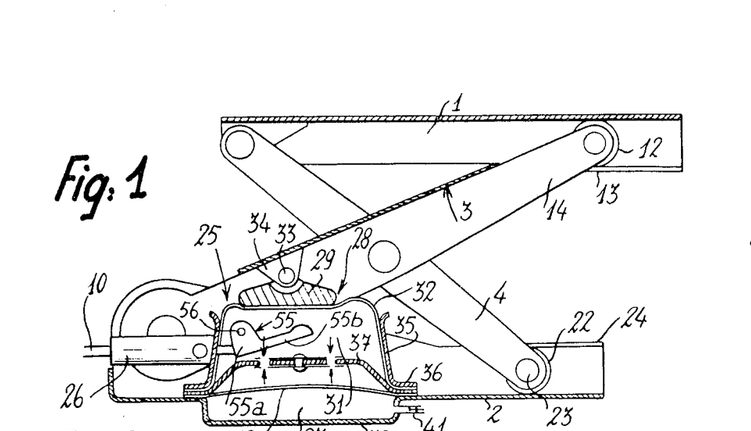
FIG. 1 is a section taken along the line I—I of FIG. 2, showing a first form of embodiment of the sprung seat according to this invention, the squab or cushion thereof being removed to simplify the drawing.
Figures 2, 8:
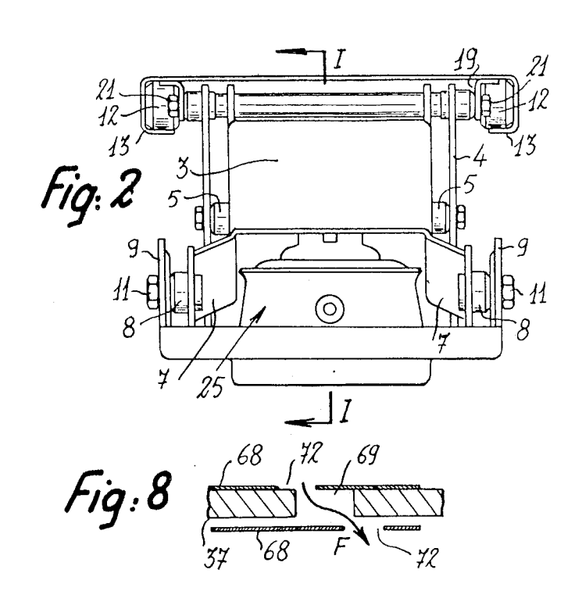
FIG. 2 is a front elevational view of the seat shown in FIG. 1.
FIG. 8 is a fragmentary section taken along the line VIII—VIII of FIG. 6, showing on a larger scale the partial overlapping of the holes in the partition by the damping valve means, the lower valve being slightly unseated from the partition as a consequence of the force of the liquid flowing from the upper compartment of the actuator.
Figure 3:
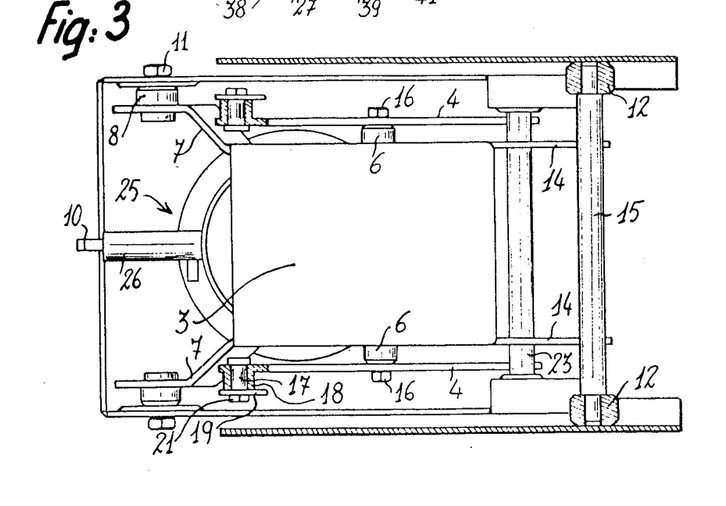
FIG. 3 is a plane view from above of the same seat, the cradle or squab frame being removed for the sake of clarity.

Referring first to FIGS. 1 to 3 of the drawings, the seat according to this invention, intended more particularly for equipping off-the-road vehicle such as farming tractors, public works equipments, trucks, material handling equipments or machines, etc., comprises a movable frame 1 for a seat squab or cushion and the seat back (not shown) for the driver or any other occupant of the vehicle.

According to the above-mentioned French Patent Application, this seat comprises an elastic suspension system mounted on a base frame 2 and provided with resilient return means. This suspension system comprises a central inclined rigid main beam 3 pivoted to the base frame 2 at its front end and to the rear portion of said movable frame 1 at its rear end. Thus, in the example illustrated the rigid beam 3 is set at an angle of about 45° to the horizontal. In addition, this main beam is adapted to co-act with a pair of lateral parallel arms 4 pivoted at one end to the rear portion of base frame 2 and at the opposite end to the front portion of the seat movable frame 1.

Each lateral arm 4 has its intermediate portion rigidly connected to a transverse stub shaft 5 trunnioned in the main beam 3. For this purpose, this main beam 3 carries a pair of opposite cylindrical median sockets 6 having aligned bores engaged by the transverse stub shafts 5 supporting the lateral arms 4. Besides, the main beam 3 comprises at its front end a pair of bent lateral extensions 7 formed with circular apertures engaged by corresponding shouldered stub shafts 8 extending through a pair of upstanding vertical side flanges or plates 9 (assuming that the base frame 2 is horizontal) secured to the sides of base frame 2. Nuts 11 engaging screw-threaded portions of said stub shafts 8 externally of said supporting flanges or plates 9 keep these stub shafts 8 in position.

The upper end portion of main beam 3 is provided with a pair of lateral rollers 12 adapted to roll on metal U-sectioned runways 13 secured to said cradle 1. These runways 13 are so positioned that one of the lateral wings of their cross section supports in rolling engagement the rollers 12 associated therewith, as shown in FIGS. 1 and 2.

The central portion of the main beam 3 consists of a plate having the aforesaid bent lateral extensions 7 formed on its front end, and a pair of rectilinear arms 14 at either ends of its rear portion, said arms 14 being rigidly connected in a manner known per se to a transverse shaft 15 carrying the pair of end rollers 12.

Nuts 16 engaging screw-threaded portions of stub shafts 6 are provided for rigidly assembling said stub shafts to the lateral arms 4.

The upper ends of lateral arms 4 adjacent the cradle 1 are each formed with an aperture receiving a corresponding pivot pin 17 extending through a ring 18, these elements being held in position by angle members 19 secured to the cradle 1 whereas the pivot pins 17 carry nuts 21 for securing the assembly to said angle members 19.

The lower end portions of lateral arms 4 are provided with U-sectioned rollers 22 similar to rollers 12. For this purpose, a transverse shaft 23 extends through the lower ends of arms 4 and carry a pair of rollers 22 at its ends. The runway 24 of rollers 22 are formed integrally with the metal base 2, the two wings of the U being disposed horizontally and receiving therebetween the corresponding roller 22 which is retained in the horizontal direction by the intermediate vertical portion of its U-section.

According to the instant invention, resilient means for biasing the cradle 1 and the suspension system comprising the main rod 3 and lateral arms 4 to their initial position consist of a hydropneumatic device 25 associated with an automatic monitoring distributor 26 adapted to be connected via a pipe line 10 to the pressure-fluid circuit of the vehicle, said distributor 26 being adapted to regulate the pressure in the hydropneumatic device 25 as a function of the vertical oscillation of the movable seat frame 1.

The seat construction illustrated in FIGS. 1 to 5 of the drawings is intended for vehicles equipped with a hydraulic circuit, so that the distributor 26 can control automatically the hydraulic section of the hydropneumatic device 25. This device 25 comprises a pneumatic chamber 27 associated with a hydraulic actuator 28 provided with a piston 29 coupled to the main beam 3 under which the piston 29 of actuator 28 is located, this actuator 28 reacting against the base frame 2.

Figure 10:
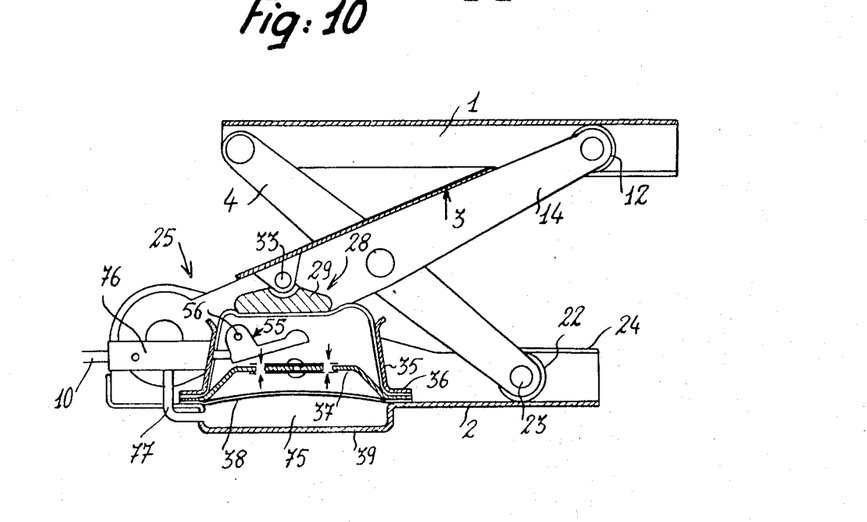
FIG. 10 is a sectional view similar to FIG. 1, showing another form of embodiment of the seat according to this invention.

Therefore, the hydraulic actuator 28 lies above the pneumatic chamber 27 and beneath the main beam 3. Furthermore, the hydraulic chamber 31 of actuator 28 is bounded on the side of main beam 3 and laterally by a reinforced membrane 32 receiving the pressure of piston 29 on its top surface, as shown in FIGS. 1 and 10.

This piston 29 of relatively flat configuration so as to engage the reinforced membrane 32 with a large bearing surface area consistent with a suitable surface area:-pressure ratio is pivotally mounted about a trunnion 33 rigid with a central support 34 of main beam 3. The reinforcing membrane 32 is a substantially bell-shaped member engaging with its upper portion the underface of piston 29 and having its base secured substantially level with the surface of base member 2. According to a specific feature characterizing this invention, the actuator 28 comprises a rigid annular casing 35 surrounding laterally the reinforced membrane 32 across the base member 2 to which said casing 35 is secured, for example by means of bolts, rivets or any other suitable fastening means (not shown) extending through or encircling an external peripheral flange 36 holding the casing 35 in position.

The base of the reinforced membrane 32 further comprises a peripheral external flange clamped between the flange 36 and the base frame 2 with the interposition of a partition 37 the function of which will be explained presently. Also inserted between this partition 37 and the base frame 2 is the peripheral outer flange of a flexible membrane 38 separating the pneumatic chamber (for example an air-filled chamber) 27 from the remaining inner volume of the reinforced membrane, filled with liquid under pressure, for example a suitable oil. In the embodiment illustrated the pneumatic chamber 27 is bounded on the side opposite said flexible membrane 38 by a bottom wall 39 obtained by pressing the metal base frame 2 or through any other suitable means, this bottom 39 having a substantially cylindrical shape.

The dimensions of said pneumatic chamber 27 are properly determined in order to obtain a chamber volume consistent with the maximum efficiency contemplated for the seat suspension.

The elastic membrane 38 consists for example of rubber and closes the pneumatic chamber 27 in a perfectly fluid-tight manner due to the clamping of its peripheral outer flange between the base frame 2 and the aforesaid partition 37, the latter being retained in turn by the rigid casing 35. The pneumatic chamber 27 is adapted to be pressurized by means of an inflation valve 41. Consequently, the flexible membrane 38 receives a pneumatic pressure on its bottom face and a hydraulic pressure on its top face registering with the membrane 32, these pressures varying as a function of the weight of the occupant of the seat, for example the driver of the vehicle, and also according to the intensity of the vibration to which the seat is submitted.

The hydraulic chamber of actuator 28 comprising the rigid casing or metal barrel 35 of substantially furstoconical configuration flaring downwardly and outwardly, and the bell-shaped membrane made for example of reinforced rubber, is capable of withstanding relatively high pressures. However, this actuator is flexible and secured in a fluid-tight manner to the base frame. As already explained in the foregoing, the upper portion of the reinforced membrane 32 engages the flattened cylindrical member 29 of which the bearing surface area is determined as a function of the efforts to be transmitted to said membrane 32 as a consequence of the vertical movements accomplished by the main beam 3 of the suspension mechanism.

Figure 4:
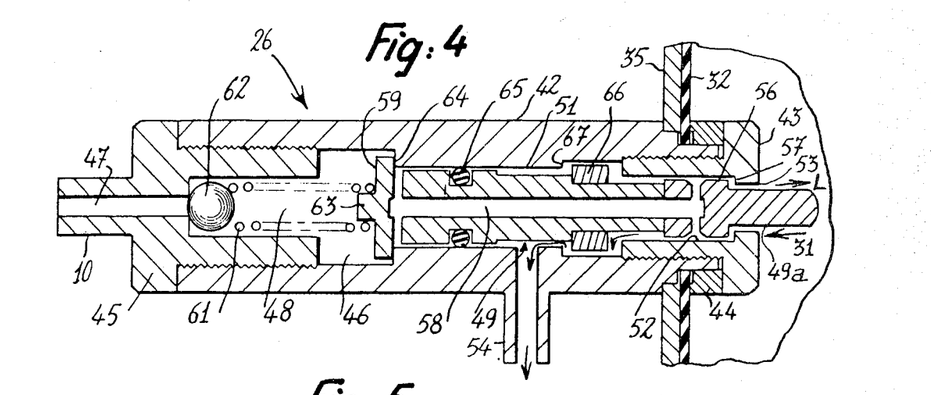
FIG. 4 is a longitudinal section showing on a larger scale the automatic monitoring distributor of the hydraulic actuator equipping the seat of FIGS. 1 to 3, the spool valve of this distributor being shown in the first position mentioned hereinabove.
Figure 5:
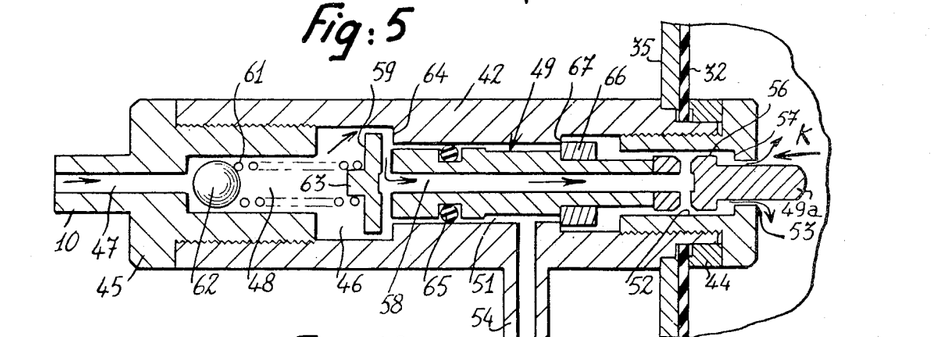
FIG. 5 is a sectional view similar to FIG. 4, showing the distributor spool valve in the second position aforesaid, in which the inner space of the actuator communicates with the hydraulic circuit of the vehicle.

The chamber 31 thus formed is supplied with hydraulic fluid under pressure by the automatic monitoring distributor 26 to be described hereinafter with reference more particularly to FIGS. 4 and 5.

This distributor 26 comprises an elongated hollow body 42, of cylindrical shape in the example illustrated, having one end fitted in fluid-tight manner through the lateral wall of the rigid casing or metal barrel 35 and also through the lateral wall of the reinforced membrane 32. For this purpose, the end of said body 42 engaging the casing 35 comprises an inner tapped cavity for screwing a head 43 therein with the interposition of a tightening washer 44 engaging the wall of said membrane 32. This membrane 32, together with the rigid casing 35, engages annular grooves coaxial to said cylindrical body 42 in which they are retained by the head 43 and washer 44.

The end of cylindrical body 42 which is opposite said head 43 is likewise provided with a member 45 screwed in a cylindrical chamber 46 of body 42, said member 45 comprising a nipple or union 10 already mentioned in the foregoing for connecting the body 42 to the hydraulic circuit of the vehicle. An axial passage 47 connects this hydraulic circuit to chamber 46, the portion of member 45 engaging said chamber 46 comprising likewise a cylindrical cavity 48 of greater diameter than said passage 47.

According to a specific feature of the present invention, a movable spool valve 49 is mounted for fluid-tight sliding movement in a substantially cylindrical chamber 51 formed in the body 42 and connecting the inlet chamber 46 to the hydraulic chamber 31, the head 43 having a suitable axial passage 52 formed therethrough for this purpose. Thus, the inner space of the body 42 communicates via a central aperture 53 of head 43 with the hydraulic chamber 31 and further comprises a lateral outlet 54 opening substantially into the central portion of the bore 52 receiving said spool valve 49, so that the liquid under pressure can be discharged from the hydraulic cylinder 28 to the outside.

According to an essential feature characterizing this invention, the automatic monitoring distributor 26 comprises means for controlling automatically the movement of spool valve 49 between a first position in which the liquid from cylinder 28 flow from chamber 31 to the out let port 54 of the distributor, while the frame 1 is moving downwards and the main beam 3 pushes the piston 29 against the reinforced membrane 32, the supply of liquid under pressure to this distributor 26 being cut off. Complementarily, said means may bring the spool valve 49 to another position in which liquid under pressure penetrates into the hydraulic chamber 31 while the outlet 54 is closed or shut off. This second position corresponds to the injection of hydraulic fluid into the actuator 28 for inflating the membrane 32 and therefore lifting the seat frame 1, and is illustrated in FIG. 5, FIG. 4 illustrates the spool valve in the first above-defined position in which the hydraulic liquid is expelled by the pressure exerted through piston 29 from within the actuator 28 to the outside via outlet 54 of distributor 26. In the exemplary form of embodiment illustrated in the drawings the above-defined automatic means controlling the position of spool valve 49 comprise a bell-crank lever 55 visible in FIG. 1 and mounted within the hydraulic chamber 31 in a manner permitting of releasing the sliding movement of spool valve 49 towards the input union or nipple 10 of distributor 26 as a consequence of the thrust exerted by the membrane 26 receiving the pressure of piston 29 when the seat frame 1 is lowered. Thus, said bell-crank lever 55 is fulcrumed about a pivot pin 56 secured across the metal casing 35 above the level of the movable spool 49. The pivot pin 56 of this bell-crank lever 55 extends through an end portion 55a of lever 55 which is located in close vicinity of spool valve 49 and somewhat at the same level as this valve, said portion 55a having a perpendicular extension in the form of an elongated portion 55b having its end rounded at the top so as to register with the lower face of said reinforced membrane 32. Since the upper end of the elongated portion 55b is rounded, any risk of damaging the reinforced rubber membrane 32 when the latter is urged against said rounded portion of bell-crank lever 55 as a consequence of the thrust exerted by piston 29 is safely precluded.

The end portion 55a adjacent said spool valve 49 engages a rounded end portion 49a of said spool valve 49 which constitutes a finger projecting through the head 43 into the hydraulic chamber 31. In the form of embodiment illustrated in detail in FIGS. 4 and 5, this finger 49a is separated from the main spool valve body 49 and comprises an enlarged base portion 56 adapted to engage a corresponding shoulder 57 formed in the head 43 for limiting the penetration of said finger 49a into the hydraulic actuator 28. It is clear that when the membrane 52 is lowered as a consequence of a jolt, thus causing the piston 20 to depress said membrane, the latter engages the rounded end portion of bell-crank lever 55, thus causing the latter to push the spool-valve extension 49a inwardly. Therefore, the spool valve 49 proper is pushed by its finger 49a in its bore 52 towards the inlet union or nipple 10 as a consequence of the pivotal movement of bell-crank lever 55. Conversely, a movement of spool valve 49 and of its finger 49a in the opposite direction will cause the bell-crank lever 55 to pivot about its pivot pin 56 in such a way that the rounded end portion of its longer arm 55b will push the membrane 32 upwards. Thus, the lever 55 can be caused to pivot back to its initial position by the pressure exerted thereon by the end finger 49a of spool 49.

According to another feature characterizing this invention, the spool valve 49 comprises an axial longitudinal passage 58 coaxial with the cylindrical body 42. One end of this passage 58 communicates with the interior of hydraulic chamber 31 via an intermediate passage or clearance formed between said finger 49a and the head 43, as clearly shown in FIGS. 4 and 5. The opposite end of passage 58 registers with a valve member 59 constantly biased to its closed position by resilient return means consisting in this example of a coil compression spring 61. This spring 61 reacts against a ball valve 62 disposed in the bottom of chamber 48 and adapted to co-act with the seat formed by the registering end of passage 47 when the hydraulic pressure in this passage is not sufficient for unseating the ball valve 62.

The return spring 61 engages a central projection 63 of valve member 59. Thus, the latter is normally urged by said spring 61 to its seated position with respect to an annular shoulder 64 limiting the cylindrical chamber 46 of spool valve 49.

According to another feature characterizing this invention, the spool valve 49 comprises an O-ring 65 disposed between the outlet 54 of the distributor and valve member 59 in order to permit a fluid-tight sliding engagement between the bore of distributor body 42 and spool valve 49. The latter further comprises a ring 66 disposed coaxially to the central passage 58 between the outlet 54 of distributor 26 and the passage 53 thereof communicating with actuator 28. This ring 66 is secured to the spool valve 49 and can thus follow the axial movements thereof between a pair of abutment members consisting the one of the registering end of the screw-threaded head 43 and the other of an annular shoulder 67 formed in the body 42. Thus, when the seat cradle is lowered as a consequence of a jolt, the membrane 32 urged by piston 29 causes the lever 55 to pivot so that its portion 55a pushes the spool valve 49 against valve member 59 and the antagonistic force of spring 61. This position is illustrated in FIG. 5 showing the valve member unseated. The actuator 28 further comprises a hydraulic damper consisting of the aforesaid partition 37 in the form of embodiment illustrated and also of associated damping valve members 68 of which two are shown by way of example (see FIGS. 1 and 6 to 9).

The partition 37 is a substantially dished and inverted pressed metal part (i.e. with its bottom higher than its edge) immersed in the liquid under pressure contained in chamber 31. The outer peripheral flange of this dished and inverted partition 31 is secured to the pneumatic chamber 27 and to the base of actuator 28; the partition 37 has a plurality of holes 69 (see FIGS. 6 to 9) formed through its bottom along a circular line concentric to the actuator and partition assembly. These holes 69 are thus disposed at spaced intervals and associated with a pair of flexible valve members 68 adapted to control the flow of liquid from one compartment to the other of chamber 31.

These valve members 68 consist each of a circular metal disc secured to the center of the bottom of the partition 37 through any suitable fastening means such as a rivet 71. Each valve member 68 has formed therethrough a series or circular holes 72 corresponding to the holes 69 of partition 37 but of smaller diameter. The valve members 68 are secured to said partition 37 on either side thereof so that the orifices 72 of each valve member 68 overlap only partially the holes 69, as clearly shown in FIGS. 6, 8 and 9, means being also provided for preventing the valve members 68 from pivoting in relation to partition 37 once the angular position of their orifices 72 has been properly set in relation to that of holes 69 of partition 37.

Figure 6:
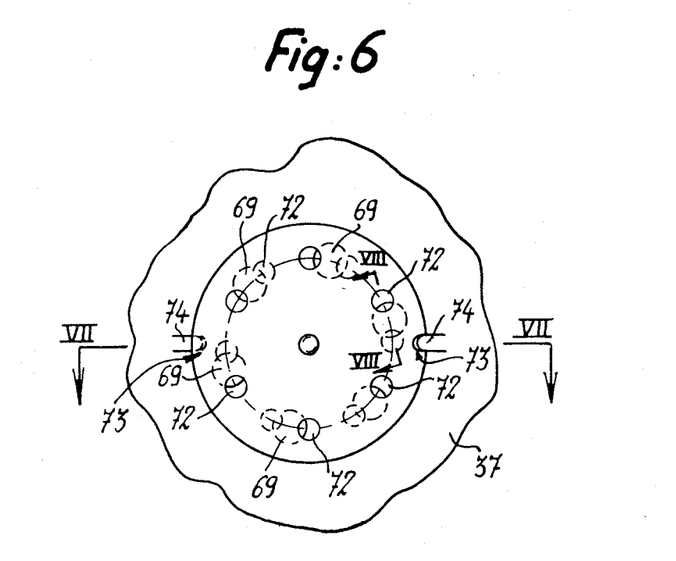
FIG. 6 is a plane view from above showing on a larger scale, with parts broken away, the perforated partition and the valve means associated therewith, constituting the hydraulic damper of the hydropneumatic device illustrated in FIGS. 1 to 5.
Figure 7:
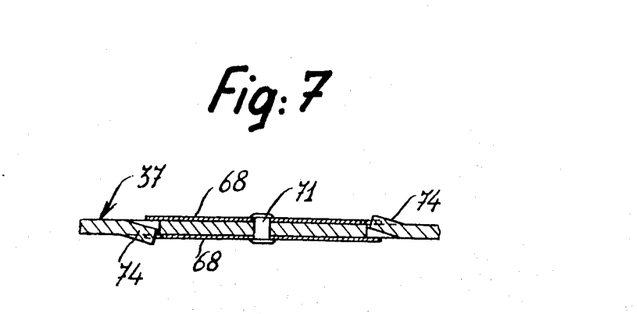
FIG. 7 is a section taken along the line VII—VII of FIG. 6.

In the above-described form of embodiment the means contemplated for preventing the valve members 68 from pivoting in relation to partition 37 consist of a pair of peripheral notches 73 formed during the punching operation required for the manufacture of said valve members 68. These notches 73 are each engaged by a lug 74 projecting from partition 37. These stop lugs 74 may be formed for instance by punching; they are located in opposition on a common diameter and slightly inclined to the plane of valve members 68 for engagement into the registering notches 73, as shown in FIGS. 6 and 7. The position of lugs 74 and the position of the corresponding receiving notches 73 is determined accurately in relation to the regularly spaced holes 69 and orifices 72, to permit a proper gauging of the passage available for the liquid of actuator 28 and ensure a reliable operation of the damper.

Figure 9:
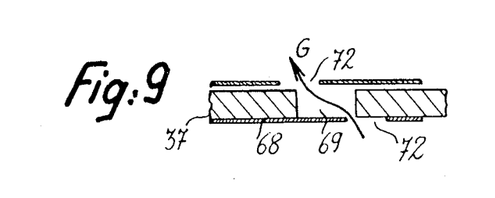
FIG. 9 is a section similar to FIG. 8 showing the position of the valve means when the liquid flows back from the lower compartment to the upper compartment through the perforated partition, during the upward stroke of the seat squab frame.

As shown in FIGS. 8 and 9, the upper valve member 68 is pressed against the partition 37 when the liquid flows therethrough towards the flexible membrane 38 of pneumatic chamber 27, this direction of flow being illustrated diagrammatically by the arrow F. On the other hand, the lower valve member 68 is slightly unseated from partition 37 as a consequence of the hydraulic pressure exerted on said lower valve member, the liquid flowing through the partition 37 and one portion of the cross-sectional area of apertures 72 and the whole of the cross-sectional area of holes 69 of partition 37.

Conversely, when the liquid flows through partition 37 in the opposite direction, i.e. upwards in the direction of the reinforced membrane 32 as when the seat cradle or frame 1 is lifted as a consequence of a jolt, the liquid under pressure presses the lower valve member 6, and then flows through the orifices 72 and holes 69 as shown by the arrow G in FIG. 9.

During the operation of this hydraulic damper the notches 73 and lugs 74 associated therewith prevent any rotation of valve members 68 about their common axis and therefore any misadjustment of the damper after the initial adjustment of the positions of orifices 72 in relation to holes 69.

The above-described sprung seat and moe particularly the hydropneumatic device 25 associated therewith operate as follows:

The pneumatic chamber 27 is firstly inflated to a suitable pressure by means of a valve 41, this pressure varying as a function of the weight of the occupant of the seat and also of the intensity of the vibration likely to be applied to the seat. Then the inlet union or nipple 10 of distributor 26 is adequately connected to the hydraulic circuit of the vehicle, the inner space of distributor 26 communicating with the hydraulic chamber of actuator 28 and being filled with liquid under pressure such as oil.

When jolts are applied to the seat, the seat cradle 1 is lowered and causes the main beam 3 and lateral arms 4 to pivot towards the base frame 2, so that piston 29 pushes the reinforced membrane 32 towards the monitoring lever 55. When the upper rounded portion of the elongated portion 55b of this lever is moved by the membrane 32, the lever 55 rotates about its pivot pin 56 and its end portion 55a pushes the finger 49a of spool valve 49 towards valve member 59. This movement of spool valve 49 is shown by the arrow K in FIG. 5.

At the same time, liquid under pressure is forced into the hydraulic chamber through partition 37, as illustrated in FIG. 8, so that the flexible rubber membrane 38 is tensioned towards the bottom 39 of the pneumatic chamber 27.

The spool valve 49 unseats the valve member 59 whereby the liquid under pressure can flow from chamber 46 into the longitudinal passage 58 of spool valve 49 after having slightly unseated the ball valve 62 to open the inlet passage 47. On the other hand, the O-ring 65 prevents the liquid from overstepping its level and therefore from flowing through the outlet 54 of distributor 26. Simultaneously, the ring 66 is moved to a position of fluid-tight engagement with its seat 67, so that the liquid cannot flow from this side to the outlet 54. As a result, the liquid flowing from the hydraulic circuit of the vehicle is injected into the hydraulic chamber 31 via the longitudinal passage 58 and the clearance left between finger 49a and head 43 of distributor 26. The path thus followed by the liquid is shown by the arrows in FIG. 5. Consequently, the hydraulic pressure in actuator 28 increases, the reinforced membrane 32 is pressed against piston 29 and spreads out while pushing this piston upwards. The beam 3 and arms 4 are thus lifted and carry along the seat frame 1 which gradually resumes its initial position. When the membrane 32 moves away from the rounded end of lever 55, the latter's pressure against spool valve 49, which is transmitted to valve member 59, is discontinued, so that this valve member 59 urged by its return spring 61 resumes its fluid-tight engagement with its seat 64. This condition is illustrated in FIG. 4, the ball valve 62 shutting off again the fluid injection passage 47. Liquid under pressure is thus trapped in chamber 46 and cannot flow along spool valve 49 so that the latter subsequently moves slightly away from valve member 59 (see arrow L in FIG. 4) and the liquid under pressure from hydraulic chamber 31 can flow past the now unseated ring 66. The liquid is thus discharged to and through the outlet 54 along the path shown by the arrows in FIG. 4. Therefore, the hydraulic pressure decreases in actuator 28 and this pressure decrement is damped by the partition 37 and its damping valve members 68 through which the liquid flows upwards as illustrated in FIG. 9.

Each time a jolt is applied to the seat, the distributor 26 co-acting with the pivoting lever 55 associated with spool valve 49 and valve member 59 exerts an automatic monitoring or regulating action on the hydraulic pressure in actuator 28. This regulation ensures a constant balancing of the seat level and also of the hydraulic pressure within actuator 28 as a function of the weight of the driver or other occupant of the seat.

The function of hydraulic chamer 31 is to provide a constant, optimum adjustment level irrespective of the load applied to the seat, and also to modulate the hydraulic pressure as a function of the seat movements when the vehicle is in motion.

On the other hand, the liquid under pressure has the following functions: On the one hand, it provides a fluid connection between piston 29 and the pneumatic chamber 27 imparting the desired elasticity of the seat suspension system, so that it will absorb shocks and jolts without any parasitic mechanical frictional contact, only by virtue of the changes produced in the shape of the reinforced membrane 32.

On the other hand, the liquid under pressure damps out and retards the movements of the seat suspension system by reducing its output through the gauged orifices 69 and 72 of partition 37 and of damping valve members 68.

A dual function is devolved to this partition 37. Firstly, it permits of limiting the beat or movements of the flexible membrane 38 of pneumatic chamber 27 and therefore the volume of this chamber. Secondly, it permits the flow of liquid to one or the other side of this membrane and also of valve members 68 in order to compress the gas contained in pneumatic chamber 27, thus imparting the necessary elasticity to the suspension system when the piston 29 of actuator 28 is depressed. As a complement thereto, the partition 37 is capable of exerting a force in the opposite direction on this actuator 28, thus causing the upward movement of piston 29 and therefore of the suspension system, since the liquid can flow in the opposite direction, that is, upwardly as illustrated in FIG. 9. This liquid movement takes place through partition 37 as mentioned in the foregoing, the orifices 72 being more or less closed according as the liquid flows in one or the other direction, the flexible valve-forming washers 68 being of the unidirectional-flow type.

Therefore, the hydropneumatic device according to this invention for automatically monitoring the hydraulic pressure in the seat suspension system is particularly advantageous, notably on account of the elimination of any parasitic mechanical frictional contact, as already explained in the foregoing.

In the inoperative condition, that is when no jolts are exerted on the seat and the driver or other occupant is seated thereon, the hydropneumatic device 25 is in the following condition: lever 55 engages spool valve 49 so that the latter will slightly unseat valve 59 from its seat 64, while ring 66 is not pressed in a fluid-tight manner against its seat 67. Therefore, a small amount of liquid under pressure flows into the hydraulic chamber 31 and causes the pressure therein to increase, thus compressing the flexible membrane 38 until a state of equilibrium is obtained between the reaction produced by this membrane and the hydraulic pressure which varies and adapts itself as a function of the weight of the driver or drivers. The seat squab frame is thus maintained at a constant level and a continuous circulation of liquid is maintained between distributor 26 and the outlet 54 thereof.

The seat according to this invention is also characterized by the following advantageous features. It can be mounted indifferently on mechanical systems having a structure other than that of the system illustrated in the drawings, for example a structure of the parallelogram or scissor type, and in any position in relation thereto. The monitoring system is an internal one, that is, integraled in the liquid-containing chamber 31, at least as far as the monitoring lever 55 and the projecting portion associated with spool valve 49 are concerned. With this arrangement, any undesired and untimely liquid leakage to the outside is safely prevented.

Similarly, the permissible movements of control lever 55 are limited and will cut off tightly and supply of fresh oil whatever its pressure may be, thus eliminating any risk of bursting the reinforced membrane while maintaining the seat at a constant level, irrespective of the driver's weight. In fact, this lever 55 is not rigidly coupled or responsive to the vertical stroke or movement of cradle 1, and becomes operative only during one fraction of this stroke, this lever being uncoupled from the seat movements immediately when the set level, that is, the level of its squab frame or cradle 1, exceeds a predetermined value. In this position, the liquid-filled chamber 31 is under pressure-release condition and communicates with the return circuit. By way of indication, the input pressure necessary for properly operating the device is about 15 bars.

In case the pressure fluid delivered by the hydraulic circuit of the vehicle exceeded this or another rated value, a regulator consisting of a hydraulic pressure-reducing device of a type known per se is fitted upstream of the monitoring distributor 26. Thus, an accurate regulation at 15 bars can be obtained from relatively high pressure values (of the order of 200 bars or more).

The double-acting hydraulic damper arranged in the liquid-filled chamber of actuator 28 is particularly reliable and can be set to provide the maximum efficiency according to the utilizations contemplated for the seat, when fitting the latter to the vehicle. This setting is accomplished without any modifications of the component elements, by simply rotating the concentric valve members 68 so as to uncover more or less the peripheral orifices 72. The thus preset assembly preserves its initial adjustment with a great stability in time, since the component elements of this system are not liable to wear and tear and operate nearly statically.

On the other hand, the upper and lower valves 68 are mounted with their orifices directed diagonally in relation to the holes 69 of partition 37, so that the oil flowing therethrough will promote the proper operation of valves 68 and provide a regular and constant damping action. In the control distributor 26 the ball valve 62 associated with valve member 59 constitutes a non-return valve system incorporated in the monitoring system, thus avoiding any momentary loss of pressure in the seat suspension when considerable amounts of fluid under pressure are drawn from the hydraulic circuit of the vehicle for operating power apparatus such as jacks, sundry actuators, etc.

In the modified embodiment illustrated in FIG. 10 the seat differs from the preceding construction in that the hydropneumatic device is adapted to be connected to a source of pneumatic fluid instead of a hydraulic source. In this arrangement, the actuator 28 does not comprise any hydraulic monitoring system but is filled permanently with oil or other suitable fluid in order on the one hand to provide the fluid connection between the actuator 28 and the pneumatic chamber 75 and on the other hand to perform like the hydraulic damper, the latter being contructed substantially like the one illustrated in FIGS. 1 to 9.

However, the pressure modulation is obtained in pneumatic chamber 75 by means of a pneumatic regulation device 76 of the pressure-reducing type. This distributor is connected via a pipe 77 to the inner space of pneumatic chamber 75, so that the inflation valve of the preceding form of embodiment can be dispensed with in this modified construction. The pneumatic monitoring distributor 76 operates somewhat like the hydraulic distributor 26 and inserts the pneumatic chamber 75 into the pneumatic circuit of the vehicle. Therefore, this version is suitable for a vehicle equipped with a pneumatic circuit system and operates with the same efficiency as the hydraulically monitored seat.

Figure 11:
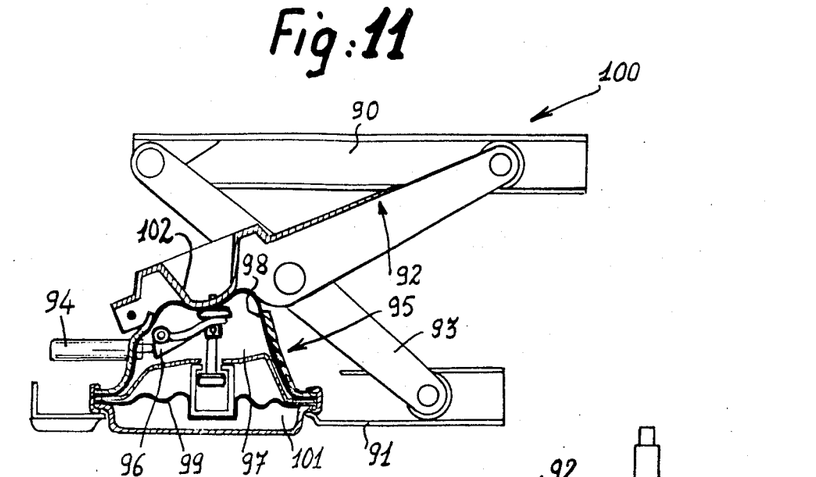
FIG. 11 is a longitudinal vertical section showing a preferred form of embodiment of the seat according to this invention.
Figure 12:
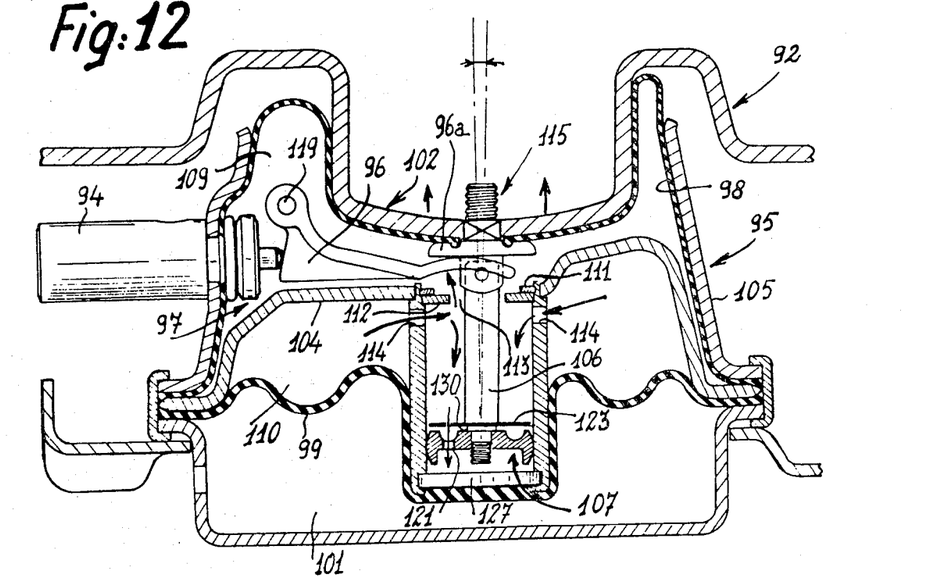
FIG. 12 is a fragmentary section showing on a larger scale and in the same plane as FIG. 11 the main beam and the hydraulic damper in their lowermost position.

Referring now to FIGS. 11 and 12 of the drawings, it will be seen that the seat 100 for equipping wheel-mounted or crawler-track vehicles adapted to be driven on more or less uneven grounds, such as farming equipments, public works equipments, trucks material handling equipments, sundry military vehicles, etc. comprises a movable upper frame 90 supporting the flexible upholstery or squab (not shown) of the back rest and seat cushion proper, on which the driver or other occupant is to sit during the operation of the vehicle.

The seat 100 comprises an elastic suspension system mounted on a base frame 91 and provided with resilient return means. The suspension system comprises a central inclined main beam 92 pivoted at one end to the base frame 91 at the front end thereof and on the other hand to the rear portion of the upper movable frame 90. This main beam 92 is normally inclined at about 45° to the horizontal and operatively connected to a pair of parallel lateral arms 93 pivoted at one end to the rear portion of said base frame 91 and at the other end to the front portion of the seat movable frame 90.

As in the embodiment illustrated in FIGS. 1 to 3, the resilient return means urging the main beam 92 and therefore the upper movable frame 90 to their normal or intermediate position comprise a hydropneumatic device in which an automatic monitoring distributor 94 is integrated. This distributor 94 may be connected to the fluid pressure circuit of the vehicle for adjusting the pressure in the hydropneumatic device as a function of the oscillation of the movable frame 90.

The hydropneumatic device comprises on the other hand a hydraulic actuator 95 monitored by the distributor 94 via a trigger lever 96 associated with the distributor 94. The lever 96 is mounted inside the hydraulic chamber 97 bounded at its upper portion by a reinforced membrane 98 and its lower portion by a flexible membrane 99.

The hydropneumatic device further comprises a pneumatic chamber 101 disposed beneath the actuator 95 and separated therefrom by the flexible membrane 99. In the example illustrated the distributor 94 communicates with the hydraulic chamber 97. The oscillations of the upper movable frame 90, transmitted by the main beam 92 and lever 96, control the monitoring distributor 94 for regulating in turn the flow of hydraulic fluid into or out from the chamber 97. The lever 96 is actuatable through a piston secured to the main beam 92 and bearing against the upper portion of the reinforced membrane 98.

This piston consists of a central bulged portion 102 of the main beam 92; this portion 102 has its convexity directed towards the hydraulic chamber 97 and bears against the reinforced membrane 98.

This piston 102 co-operates with a hydraulic damper 103 housed in the chamber 97 and consisting essentially of a rigid shaped partition 104 immersed in the liquid under pressure contained in said chamber 97, the outer periphery of said partition 104 being secured to the base of the body 105 of actuator 95.

Figure 15:
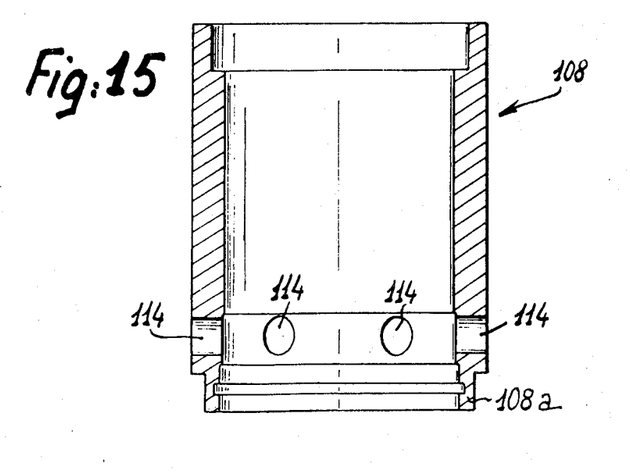
FIG. 15 is an axial section taken along the body of the damper illustrated in FIGS. 11 to 13.

The hydraulic damper 103 further comprises a rod 106 rigid with the piston 102 in the central area thereof, and this rod carries at its end opposite the piston 102 a second end piston 107 located within a cylindrical body 108 having its upper portion secured to the rigid partition 104. The latter has a central aperture formed therein and the body 108 is secured to the edge of this aperture. The corresponding end of this body 108 is open to permit the fluid communication between the upper compartment 109 and the lower compartment 110 of actuator 95.

In the example illustrated, the body 108 is secured to the partition 104 by crimping the upper edge 108a of body 108 to the partition 104 and inserting an inner washer 111. Under this washer 111 is another washer 112 fitted in the inner wall of the body 108 and formed with a central orifice 113 of a diameter greater than that of said rod 106.

On the other hand, a plurality of orifices 114 are formed through the body 108 in the vicinity of said partition 104. Thus, the liquid under pressure contained in compartment 109 can be forced into the lower compartment 110 through the passage orifices 113 and 114. The cross-sectional area of the passage 113 permitting the flow of liquid and coaxial to the rod 106 is smaller than the sum of the cross-sectional areas of orifices 114. The lower portion of said body 108 is fitted into a corresponding cavity formed in the flexible membrane 99.

Figures 14, 19:
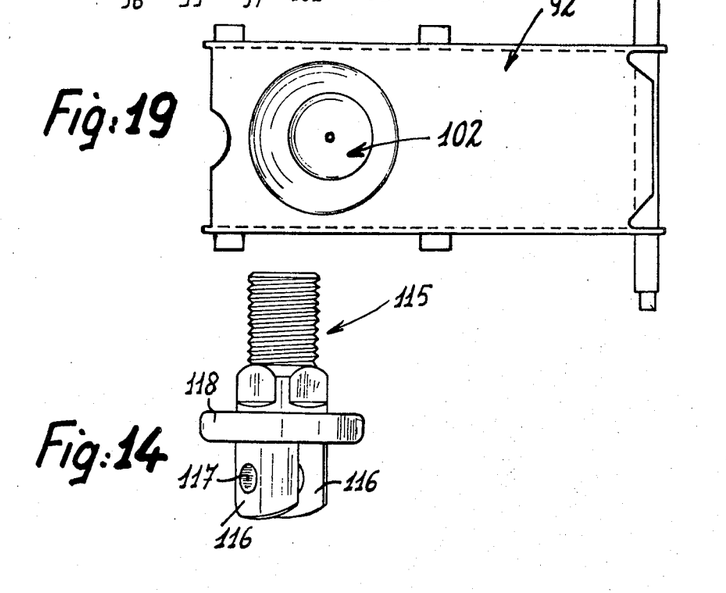
FIG. 14 is a perspective view showing on a larger scale the member interconnecting the rod of the damper and the piston of the main beam.
FIG. 19 is a plane view showing on a larger scale the main beam of the seat illustrated in FIG. 11.

The rod 99 extends through the reinforced membrane 98 and the piston 102 by means of an end screw 115 comprises a pair of parallel lugs 116 (see FIG. 14) interconnected by a transverse pin 117; these elements are located within the compartment 109 of the actuator. The end 96a of control lever 96 is suitably bent and engaged between the lugs 116 on the one hand and between the pin 117 and an intermediate flange 118 of the screw, which engages the membrane 98, on the other hand. The screw 115 will thus provide a pivoted coupling for the lever 96, whereby the to-and-fro movements of rod 106 in a vertical plane are attended by corresponding pivotal movements of lever 96 about its fulcrum 119.

Figure 16:
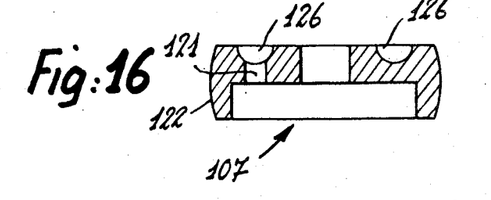
FIG. 16 is an axial section taken along the line VI—VI of FIG. 17, showing the end piston of the damper incorporated in this modified form of embodiment.
Figure 17:
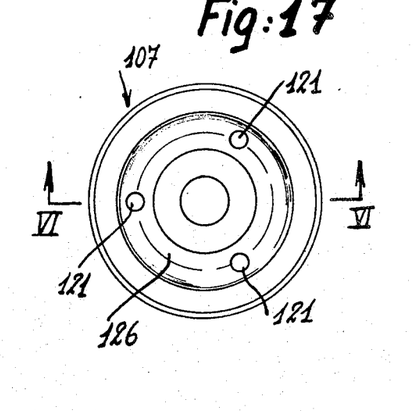
FIG. 17 is a plane view of the piston shown in FIG. 16.

The second piston 107 is screwed on the end of rod 106 and has holes 121 (three in the example illustrated in FIGS. 16 and 17, but of course this number is and merely illustrative, not compulsory) interconnected by a circular groove 126 formed on the face of piston 107 registering with the other piston 102. On the other hand, the outer surface 122 of piston 107 is rounded and has a predetermined radius of curvature, as shown in FIGS. 12 and 16, so that the rod 106 rigid therewith can oscillate through a small angle about a horizontal axis. Of course, the amplitude of this angular excursion is also a direct function of the diameter of the passage 113.

Figure 18:
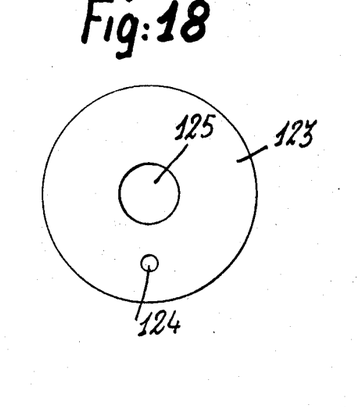
FIG. 18 is a plane view of a valve member associated with the piston of FIGS. 6 and 7.

According to the present invention it is also contemplated to provide at the lower end of rod 106 a coaxial non-return valve disk 123 in which a hole 124 (FIG. 18) is formed. This valve disk 123 has the edge of its central coaxial aperture 125 fitted in a circular groove 130 of the rod 106 permitting a predetermined degree of axial free movement of said valve disk between the surface of piston 107 and the opposite edge of said groove 130 (FIG. 12).

Thus, the valve disk 123 can perform axial movements within certain limits along the rod 106, so that when the piston 107 and rod 106 are move towards the bottom 127 of body 108, the liquid under pressure between the piston 107 and the bottom 127 is forced through the holes 121 and groove 126 into the upper compartment of body 108 by unseating the valve disk 123 in relation to the piston 107. Conversely, when this piston 107 rises away from the bottom 127, the liquid overlying the valve disk 123 urges the latter against the piston 107, so that the liquid cannot flow through the piston 107 and the holes 121 thereof communicate via the groove 126 with the single aperture 124 of valve disk 123 of which the diameter is considerably smaller than the inner diameter of the body 108.

With this arrangement, when the piston 107 moves towards the bottom 127 the liquid flows through the three holes 121 of piston 107 into the gap left between the valve disk 123 and the piston 107, so that this liquid output exceeds considerably the liquid output permitted in the opposite direction when the valve 123 is pressed against the piston 107.

The mode of operation and the specific technical advantages deriving from the seat illustrated in FIGS. 11 to 19 may be summarized as follows:

Assuming that the seat is in its lowermost position, the main beam 92, rod 106 and piston 107 are in the position illustrated in FIG. 12, in which the piston 102 is sunk home into the reinforced membrane 98. When the upper movable frame 90 and main beam 92 move upwards, the lever 96 pivots about its fulcrum 119 but its end 96a remains in engagement or coupled with the screw 115, thus actuating the distributor 94.

During the upward movement of piston 107, the valve 123 is urged thereagainst so that the hydraulic fluid contained in the body 108 but above the valve disk 123 flows through the hole 124 of this disk, and also through the groove 126 and the orifices 121 of piston 107. At the same time, one fraction of the liquid contained in the lower compartment 110 flows into the body 108 through the apertures 114, on the one hand for supplying fluid to be introduced, as explained in the foregoing, into the bottom 127 via piston 107, and on the other hand for filling with liquid the upper compartment 109 of actuator 95 through the central aperture 113 as the main beam 92 rises.

These liquid flows are illustrated by the arrows in FIG. 12; however, in this Figure, the valve disk 123 is somewhat spaced from the piston 107 in order to afford a clearer understanding of the disclosure.

Figure 13:
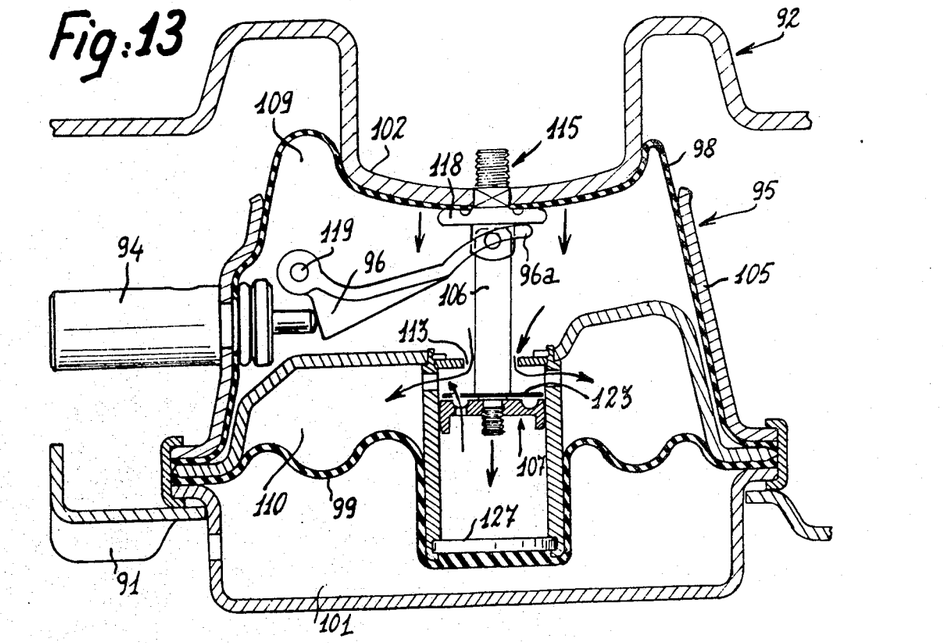
FIG. 13 is a view similar to FIG. 12 showing the main beam, its piston and the damper in its uppermost position.

FIG. 13 illustrates the main beam 92 and the hydraulic damper 103 in their uppermost positions. It is clear that the pivoted connection between the lever 96 and screw 115 of membrane 98 is maintained, the lever 96 having pivoted upwards while the distributor 94 has moved forwards within the compartment 109. In this position, the piston 102 formed integrally with the main beam 92 is at its maximum distance from the base frame 91, and the reinforced membrane 98 has its maximum expansion.

When at the beginning of an oscillation the main beam 92 and the upper movable frame 90 start oscillating and move downwardly as shown by the arrows in FIG. 13, liquid under pressure is forced out from the upper compartment 109 and into the lower compartment 110 through the aperture 113 of washer 112 and the radial orifices 114, At the same time, the liquid contained in the body 108 between the piston 107 and the bottom 127 flows through the holes 121, unseats the valve disk 123 and flows into the upper portion of the body 108 and beyond the radial orifices 114 into chamber 110.

To pass through piston 107 and into compartment 110, the liquid under pressure must flow both through the hole 124 of valve disk 123 and between the outer periphery of this disk and the surface of piston 107. The liquid output flowing through this piston 107 during the downward movement of rod 106 is thus considerably greater than that flowing through said piston 107 during the upward movement of the rod.

The paths followed by the liquid under pressure during the downward movement of piston 102, rod 106 and piston 107 are shown by the arrows in FIG. 13.

It will be seen that under these conditions the circulation of liquid under pressure takes place very satisfactorily in both directions, i.e. when the main beam 92 moves downwards with the rod 106 and when these members rise. Thus, the partial vacuum effects the more or less defective upward movements observed heretofore are eliminated completely. This is due notably to the fact that the upper compartment 109 becomes gradually filled with liquid under pressure and very smoothly due to the provision of passages 113, 114, 121, 124 in the damper 103, during the upward movement of the seat. This form of embodiment is preferred for that reason.

In the various forms of embodiment of the invention described hereinabove, the fact of providing an automatic monitoring distributor incorporated in the elastic return means makes it possible to control automatically the pressure in the hydropneumatic device independently of the weight of the occupant of the seat, and this obviously constitutes a very advantageous feature of the present invention.

Thus, the seat according to the present invention is particularly advantageous in that its adjustment is fully automatic without compelling the driver to set the oil pressure or gas pressure as a function of his weight before utilizing the seat. The device adapts itself automatically to the user's weight and also to the temperature and viscosity of the hydrualic liquid.

The form of embodiment illustrated in FIGS. 11 to 19 lends itself to many modifications and changes without departing from the basic principles of the invention. Thus, two or even three holes such as 124 having cross-sectional passage areas determined as a function of the permissible or desired fluid output may be contemplated.

On the other hand, the provision of the reinforced membrane affords a substantial reduction in the weight and over-all dimensions of the seat in comparison with a conventional cylinder-and-piston or actuator system.

Moreover, the provision of this membrane in the hydropneumatic system eliminates any detrimental frictional contact and other causes of wear and tear as normally encountered when using a conventional hydraulic cylinder-and-piston actuator; in addition, the membrane characteristics remain extremely stable during very long service periods.

The incorporation of the automatic monitoring device in the hydropneumatic system also assists in reducing the height and over-all dimensions of the seat.

Finally, this seat construction is relatively economical and not extremely complicated, in contrast with certain known seat constructions.

Of course, this invention should not be construed as being strictly limited to the forms of embodiment described, illustrated or suggested herein, since various modifications may be brought thereto without departing from the basic principles of the invention as set forth in the appended claims. Thus, the fluid connections between piston 29 of actuator 28 and the regulation distributor 26 or 76 may be provided through any suitable component elements or means other than the bell-crank lever 55 but performing the same functions. Similarly, the hydraulic damper of actuator 28 may be arranged in a manner differing from the arrangement illustrated.

What is claimed as new is:

1. A seat, notably for all wheel-mounted or crawler-truck vehicles such as farming tractors, public works equipment, trucks and sundry military vehicles, comprising a sprung suspension mounted on a fixed base frame and supporting a movable seat frame, with resilient return means, wherein said resilient return means comprise a hydropneumatic device associated with an automatic monitoring distributor integrated in said device, adapted to be connected to the pressure-fluid circuit of the vehicle, and for automatically adjusting the pressure in said hydropneumatic device as a function of the seat frame oscillations and of the weight of the seat occupant without any prior manual adjustment.

2. A seat, notably for all wheel-mounted or crawler-track vehicles such as farming tractors, public works equipments, trucks and sundry military vehicles, comprising a sprung suspension mounted on a fixed base frame and supporting a movable seat frame, provided with resilient return means, wherein said resilient return means comprise a hydropneumatic device incorporating a pneumatic chamber associated with a hydraulic cylinder and piston actuator operatively connected to a main beam of the suspension system, said hydropneumatic device being also associated with an automatic monitoring distributor forming an integral part of said device and adapted to be connected to the pressure-fluid circuit of the vehicle for automatically controlling the pressure in said hydropneumatic device as a function of the seat frame oscillations, independently of the weight of the occupant of the seat, and wherein said fixed base frame is disposed horizontally with said hydraulic cylinder and piston actuator mounted above the pneumatic chamber and under the main beam, the hydraulic chamber of said actuator being bounded on the side of said main beam and laterally by a reinforced membrane on which said piston is caused to bear.

3. A seat as claimed in claim 2, wherein said piston consists of a flat member pivotally connected to said main beam.

4. A seat as claimed in claim 2, wherein said pneumatic chamber is separated from said hydraulic actuator by means of a flexible membrane, means being provided for connecting in a fluid-tight manner the outer periphery of said flexible membrane with said hydraulic chamber of said actuator.

5. A seat as claimed in claim 4, wherein said hydraulic actuator comprises a rigid annular case surrounding laterally said reinforced membrane transversely to the base frame to which said case is secured, said case further supporting the automatic monitoring distributor.

6. A seat as claimed in claim 5, wherein said distributor comprises an elongated body having one end fitted in a fluid-tight manner in said rigid case, and a slide valve slidably mounted in said elongated body and responsive to the hydraulic pressure, said body being provided with an inlet passage for connecting said body to the hydraulic circuit of the vehicle, with an aperture communicating with the inner space of said chamber of the hydraulic actuator, and an outlet orifice for the liquid under pressure.

7. A seat as claimed in claim 6, wherein said distributor comprises means for automatically controlling the movement of said slide valve between a first position in which the liquid in said actuator flows from the inside of said actuator to the distributor outlet during the downward movement of said movable seat frame while said main beam urges said piston against said reinforced membrane and the delivery of fluid to said distributor is stopped, and a second position in which the liquid under pressure penetrates into the chamber of said hydraulic actuator while said outlet is shut off, thus causing the upward movement of the deformable portion of said reinforced membrane, said piston and said frame.

8. A seat as claimed in claim 7, wherein said means for automatically controlling said slide valve comprise a slide-valve trigger lever pivotally mounted inside the actuator chamber so as to be capable of pivoting in one direction when said reinforced membrane is pushed downwards and pushes said slide valve under the force of said piston, said lever being then capable of pushing said slide valve towards the inlet of said distributor by engaging an end portion of said slide valve which projects into said actuator chamber, said lever being adapted to be restored by pivoting in the reverse direction to its initial position by being urged by said end portion of said slide valve, after discontinuing the supply of liquid to said actuator.

9. A seat as claimed in claim 7, wherein said slide valve comprises a central conduit of which one end communicates with the inner space of said actuator chamber, the opposite end of said central conduit opening in front of a non-return valve associated with an elastic member for returning said valve to a position in which it closes the liquid supply passage to said actuator, said liquid then flowing through the distributor outlet and said slide valve is in said first actuator discharge position due to the action of said valve.

10. A seat as claimed in claim 9, wherein said slide valve is equipped with an annular seal disposed between the distributor outlet and the inlet closing valve to ensure the fluid necessary tightness between said elongated body and said slide valve, and also with a ring coaxial with the central conduit and disposed between the distributor outlet and the port thereof communicating with said actuator, said ring being adapted to engage in fluid-tight relationship an angular shoulder formed in said body when said slide valve is moved towards the distributor inlet by said monitoring lever during the downward movements of the seat.

11. A seat as claimed in claim 2, wherein said actuator is provided with a hydraulic damper.

12. A seat as claimed in claim 11, wherein said damper consists of a partition immersed in the liquid under pressure and having its marginal portion fastened to the pneumatic chamber and to the base of the actuator cylinder, said partition having preferably the shape of an inverted cup formed with holes associated with damping valve means adapted to regulate the passage of liquid from one compartment to the other compartment of said chamber.

13. A seat as claimed in claim 12, wherein said partition has formed therein a plurality of holes forming an annular pattern around the center of said partition, two perforated valve disks, each provided with a corresponding series of orifices, being secured to said partition on either side thereof in order to cause said orifices to cover partially the holes in said partition, means being provided for preventing the valve disks from pivoting in relation to said partition after the angular position of their orifices in relation to the partition holes has been set.

14. A seat claimed in claim 2, intended for vehicles equipped with a pneumatic circuit system, which comprises a pneumatic regulation device connected on the one hand to said pneumatic chamber and on the other hand via a pressure reducing device to the pneumatic circuit of the vehicle, said actuator being filled permanently with liquid under pressure and interconnecting said pneumatic chamber and said movable seat frame.

15. A seat for all wheel-mounted or crawler-track vehicles such as farming tractors or public works vehicles, comprising a sprung suspension mounted on a base frame, supporting a movable seat frame and provided with elastic return means, wherein said elastic return means consist of a hydropneumatic device disposed on said base frame and comprising a pressure-liquid chamber associated with a pneumatic chamber, said hydropneumatic device being provided with means for regulating the pressure in said chamber as a function of the weight of the occupant of the seat, a hydraulic damper being disposed within the pressure-liquid chamber separated from the pneumatic chamber by a flexible membrane and bounded complementarily by a reinforced membrane to which the movable frame movement are impressed during the seat oscillation.

16. A seat for all wheel-mounted or crawler-track vehicles such as farming tractors or public works vehicles, comprising a sprung suspension mounted on a base frame for supporting a movable seat frame and provided with elastic return means consisting of a hydropneumatic device, equipped with an automatic monitoring device incorporated in said device, said distributor being adapted to be connected to the pressure-fluid circuit system of the vehicle and to regulate the pressure in said hydropneumatic device correlatively with the seat frame oscillation, the seat suspension comprising an inclined central main beam pivoted on the one hand to the base frame and on the other hand to the rear portion of said movable frame, said main beam cooperating with a pair of lateral arms pivoted at their ends of said base frame and said seat, each arm having its intermediate portion rigidly secured to a transverse shaft adapted to pivot in said central main beam, said hydropneumatic device comprising a pneumatic chamber associated with a hydraulic actuator having its piston connected to said main beam under which said piston and said actuator are located so that said actuator bears on said base frame, said monitoring distributor communicating either with the hydraulic chamber of said actuator or with said pneumatic chamber, said hydraulic chamber being bounded, on the side of said main beam, by a reinforced membrane on which said piston is caused to bear, said piston consisting in fact of a central bulged portion of said main beam of which the convexity is directed towards said hydraulic chamber and bearing against said reinforced membrane, said piston cooperating with a hydraulic damper housed in said chamber and comprising a partition immersed in the pressure liquid and of which the marginal portion is fastened to the base of said actuator, said damper further comprising a rod rigidly connected to the aforesaid piston of said main beam and comprising a second piston fitted in a body secured to said partition, the passages for the hydraulic fluid being formed in said body and said second piston.

17. A seat as claimed in claim 16, wherein, between the end of the damper body which is secured to the partition of damper rod, on the one hand, and in the damper body on the other hand, hydraulic fluid passage means are formed, the cross-sectional area of the fluid passage between the rod and the body end being smaller than that of the passages formed laterally through the wall of said body.

18. A seat as claimed in claim 17, wherein said damper rod extends through a washer formed with a central passage aperture and fitted into the end portion of the body secured to said partition, said rod being pivoted to a distributor trigger lever pivotally mounted within said actuator chamber.

19. A seat as claimed in claim 17, wherein the lower end of said damper rod carries a coaxial valve disk through which at least one hydraulic fluid passage is formed, said valve disk being mounted for limited free axial movement so that when said second piston rises in said body the valve disk is pressed against said second piston and when said second piston descends in said body said valve disk is moved away from said second piston to permit the flow of hydrualic fluid through said second piston and between said second piston and said valve disk into the upper compartment of the damper body.

20. A seat as claimed in claim 18, wherein the outer periphery of said second piston engaging said body is rounded to permit a slight oscillation of said piston and of the rod attached thereto about a horizontal axis, the pivotal mounting of said rod on the trigger lever of the monitoring distributor being such that said oscillation is permitted by the sliding movement of one end of said lever within said rod.

21. In a seat suspension system for use with vehicles which have a pressurized hydraulic system, a rigid frame, a seat, and a suspension attached between the frame and seat to allow the seat to move vertically with respect to the frame, such vehicles including tractors, trucks, construction machinery and the like, an improvement which allows such motion to be damped automatically as a function of the motion and independently of the weight of a user sitting on the seat, the improvement comprising a hollow and closed housing with a fixed portion secured to the frame and a movable portion secured to the suspension;

a flexible diaphragm dividing the housing into an upper chamber and a lower chamber which are isolated from each other by the diaphragm;

first means attached to the hydraulic system and the housing for allowing hydraulic fluid from the system to be delivered into and exhausted from one of the chambers and maintaining the pressure of the fluid therein against the diaphragm at a substantially constant value;

a fixed partition located within the housing and dividing said one chamber into a feed compartment and a reservoir compartment in a manner that the first means communicates with the feed compartment and the feed compartment is remote from another one of said chambers, the reservoir compartment being bounded in part by the diaphragm; and second means located within the housing and cooperating with the fixed and movable portions thereof so as to permit fluid to flow between the feed compartment and the reservoir compartment in response to motion of the movable portion, the direction of the flow being determined by the direction of the motion.

22. The improvement defined by claim 21, wherein the first means is responsive to motion of said movable portion.

23. The improvement defined by claim 22, wherein the said another one of said chambers is filled with gas.

24. The improvement defined by claim 23, wherein said gas is air.

25. The improvement defined by claim 21, wherein the second means includes a hollow cylinder with an interior cylinder bounded by an open end and a closed end, the cylinder being secured to the partition, and further includes a piston slidably located within the cylinder and attached to the movable portion to move therewith, said open end communicating with said feed compartment and said interior communicating with said reservoir compartment through at least one port in said cylinder located intermediate said open end and said closed end.

26. The improvement defined by claim 22, wherein said first means includes a valve with a delivery state and an exhaust state, the delivery state causing fluid to be delivered into the feed compartment from the hydraulic system and the exhaust state causing fluid to be exhausted into the hydraulic system from the feed compartment.

* * * * *